March 17, 1953 R. C. PRATT 2,631,339
CASEMENT BLIND

Filed April 16, 1947 7 Sheets-Sheet 1

INVENTOR.
Raymond C. Pratt
BY
Moore, Olson & Trexler
Attys.

March 17, 1953     R. C. PRATT     2,631,339
CASEMENT BLIND

Filed April 16, 1947     7 Sheets-Sheet 3

INVENTOR.
Raymond C. Pratt
BY Moore, Olson & Trexler
attys.

March 17, 1953 R. C. PRATT 2,631,339
CASEMENT BLIND
Filed April 16, 1947 7 Sheets-Sheet 6

March 17, 1953 R. C. PRATT 2,631,339
CASEMENT BLIND

Filed April 16, 1947 7 Sheets-Sheet 7

INVENTOR.
Raymond C. Pratt
BY Moore, Olson & Trexler
Attys.

Patented Mar. 17, 1953

2,631,339

UNITED STATES PATENT OFFICE 2,631,339

CASEMENT BLIND

Raymond C. Pratt, Chicago, Ill.

Application April 16, 1947, Serial No. 741,728

20 Claims. (Cl. 20—40.5)

This invention relates to casements and window structures, and to Venetian blinds, and concerns particularly a casement blind structure wherein a Venetian blind is incorporated into and becomes a part of the casement in a new and improved manner.

It is an object of the invention to provide structures of the foregoing type of improved construction and improved operating characteristics.

More specifically stated, is it an object of the invention to provide a casement blind structure wherein the casement, as for example in a window or door structure, provides a mounting for the blind in a new and improved manner.

Still more specifically stated, various objects of the invention are to provide, in a casement blind structure of the foregoing type, an improved arrangement of parts for effecting improved thermal insulation and clarity of vision, and for facilitating the cleaning of external or exposed parts, and for improving the cleanliness and durability of the blind structures.

A further object of the invention is to provide an improved Venetian blind structure.

Another object of the invention is to provide and improved double window casement structure for use in window and door openings.

Various other objects, advantages and features of the invention will be apparent from the following specification when taken in connection with the accompanying drawings wherein certain preferred structural embodiments of the invention are set forth for illustrative purposes.

In the drawings, wherein like reference numerals refer to like parts throughout.

Figure 1:
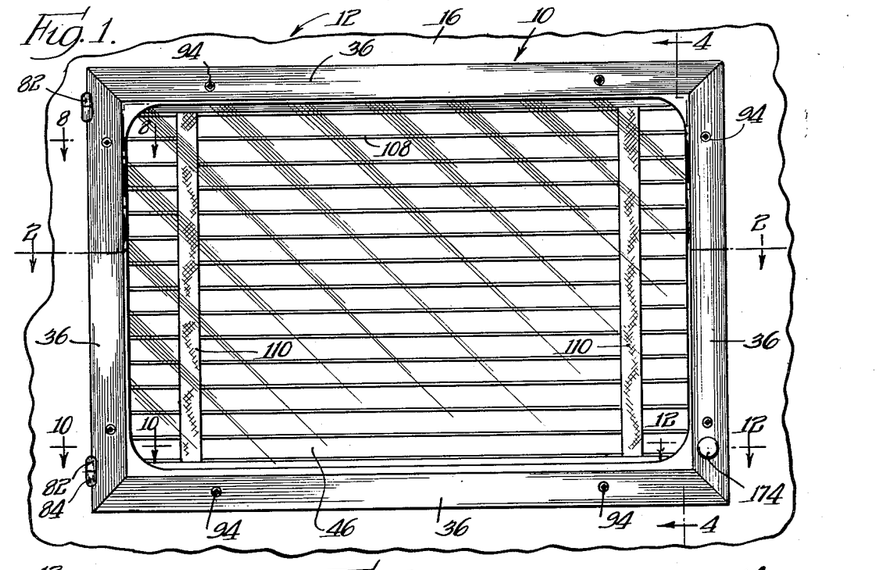
Fig. 1 is a general assembly view of a casement blind structure constructed in accordance with and embodying the principles of the invention, in one preferred or illustrative form thereof.
Figures 2, 3:
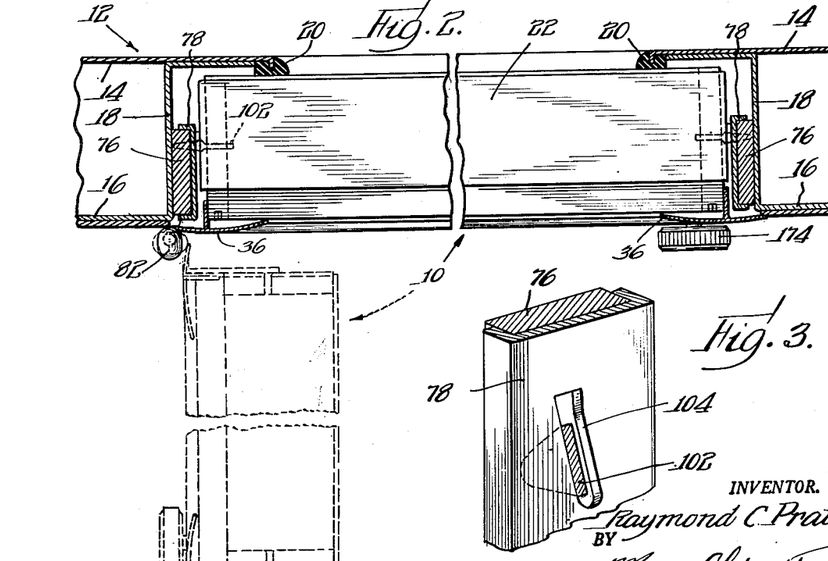
Fig. 2 is an enlarged horizontal sectional view of the structure shown in Fig. 1, taken as indicated by the line 2—2 thereof.
Fig. 3 is an illustrative detail view of a part of the locking means for holding the casement or window frame in position.

Referring more specifically to the drawings, and first to the structural embodiment illustrated in Figs. 1-23, in Fig. 1 there is illustrated a casement or window comprising a frame, generally indicated by the numeral 10, adapted to be mounted within an opening provided in a wall structure or support panel 12, which may for example comprise the wall of a building or vehicle with which the window is to be associated. As best shown in Fig. 2, the wall structure or support panel 12 may comprise, in an illustrative instance, a wall or facing member 14 arranged to be disposed along the external surface of the vehicle or building, and a facing structure 16 arranged to define the internal wall surface, and also bent or disposed as indicated at 18 so as to define the window or door opening into which the frame 10 is to be disposed. The wall members are cooperatively shaped to form a support or mounting for a gasket 20, of rubber or the like, lying substantially in the plane of the exterior wall surface. As will be understood, this gasket has a shape conforming generally to the shaping of the frame 10, rectangular in the particular embodiment disclosed, and defines the limits of the external wall surface opening. The window frame 10 is arranged to be tightly compressed against the gasket in the operation of the structure to provide a weather-proof construction, as will subsequently appear.

As further illustrated in Fig. 2, the window frame 10 is in the embodiment shown hinged to the wall structure, and adapted to be swung from its open dotted line position to its closed full line position into sealing engagement against the wall gasket 20. The hinged mounting for the frame, and the manner in which the frame is locked tightly against the gasket to provide a weather-proof seal, will be hereinafter particularly described.

Figures 4, 5, 6, 7:
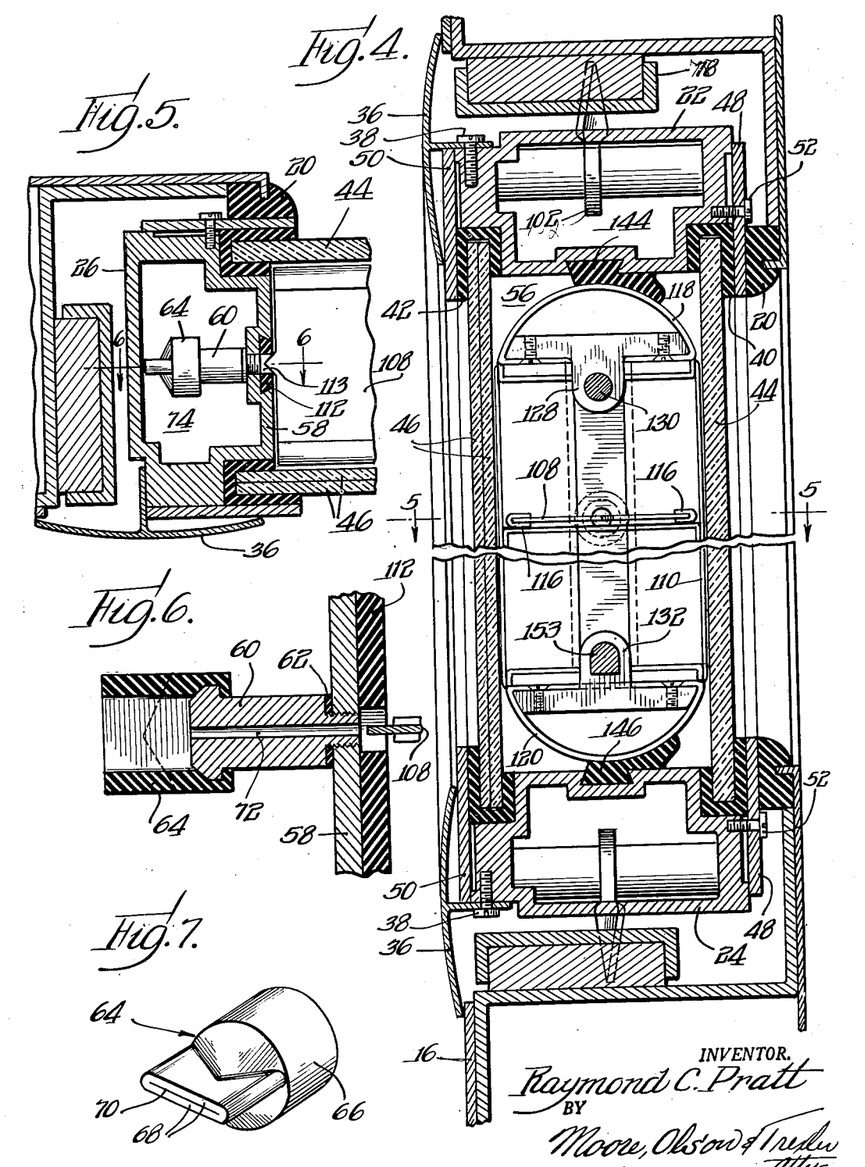
Fig. 4 is a further enlarged broken vertical sectional view of the structure of Fig. 1 taken as indicated by the line 4—4 thereof.
Fig. 5 is a partial sectional view on the line 5—5 of Fig. 4.
Fig. 6 is a sectional detail view, taken as indicated by the line 6—6 of Fig. 5, and more particularly illustrating a valve member forming a part of the construction.
Fig. 7 is a perspective detail view of the valve member.
Figure 9:
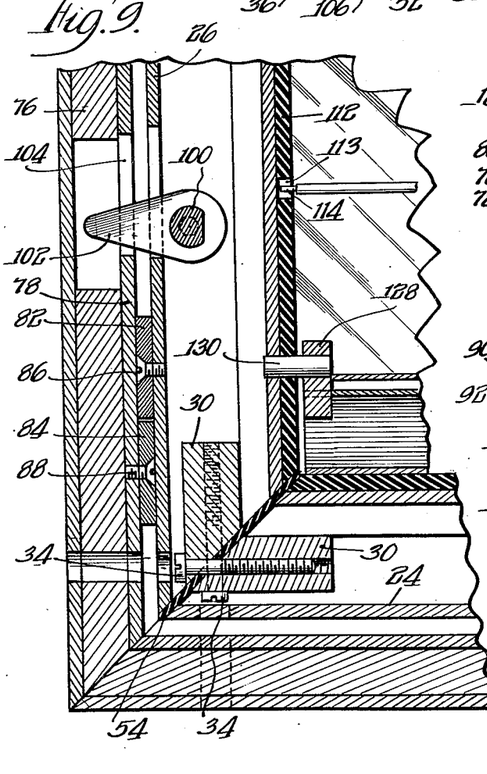
Fig. 9 is a partial sectional view of the structure of Fig. 8, taken as indicated by the line 9—9 thereof.
Figures 10, 11:
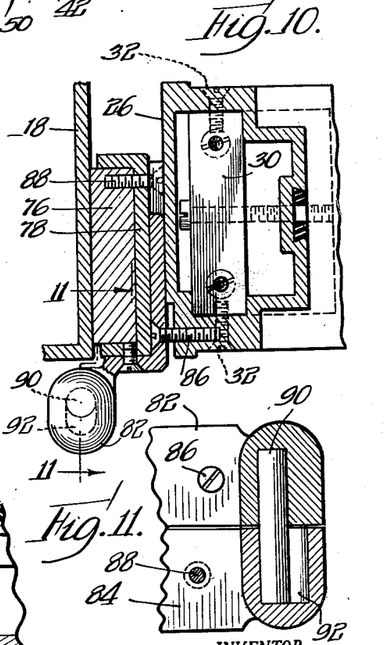
Fig. 10 is a partial sectional view of the frame along the line 10—10 of Fig. 1.
Fig. 11 is a sectional detail view of a part of the hinge structure, taken as indicated by the line 11—11 of Fig. 10.
Figures 12, 13, 14:
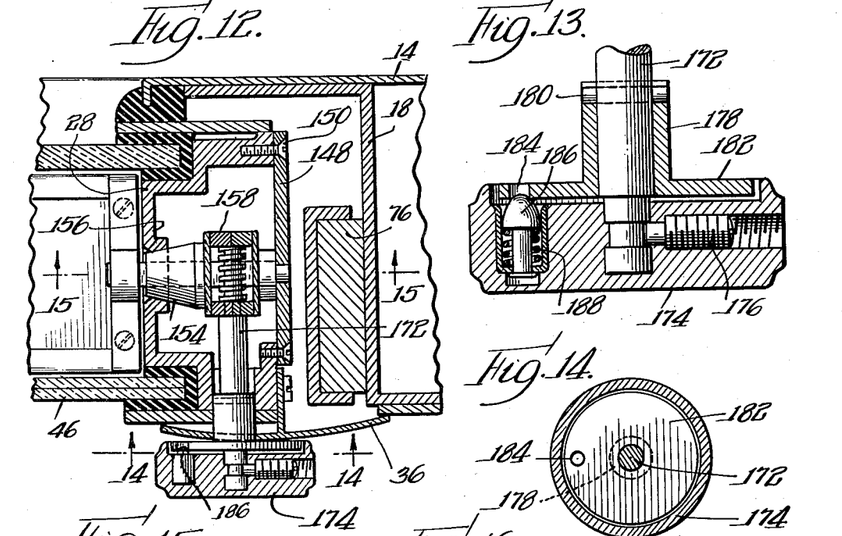
Fig. 12 is a partial sectional view of still another portion of the frame, taken along the line 12—12 of Fig. 1.
Fig. 13 is an enlarged detail section of the manual control knob forming a part of the structure of Fig. 12.
Fig. 14 is a transverse sectional view through the control knob, taken as indicated by the line 14—14 of Fig. 12.

The window frame 10 more specifically comprises a pair of top and bottom frame bars 22 and 24, Fig. 4, and a pair of side frame bars 26 and 28, Figs. 5 and 12, all of which may be of substantially similar cross sectional shape, and which may, for example, be of tubular extruded form, and constructed of aluminum or plastic, or other suitable material. Blocks 30, Figs. 9 and 10, are suitably anchored within the ends of the tubular frame members, as by means of screws 32, these blocks serving as an anchorage for bolts or screws 34 by means of which the bevelled ends of the frame tubes are secured together so as to form a rigid yet lightweight frame structure.

To bridge and finish the joint between the building wall structure and the window frame, each of the tubular frame bars 22, 24, 26 and 28 has secured thereto a facing plate 36, held in place by concealed means such as screws 38, Fig. 4, the ends of the plates being suitably bevelled or mitered so as to form a rectangular finishing frame for the window structure.

Figure 15:
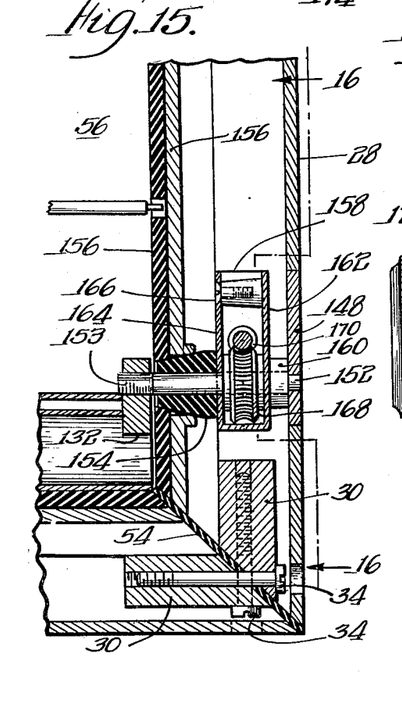
Fig. 15 is a sectional view of the parts illustrated in Fig. 12, taken as indicated by the line 15—15 thereof.
Figure 16:
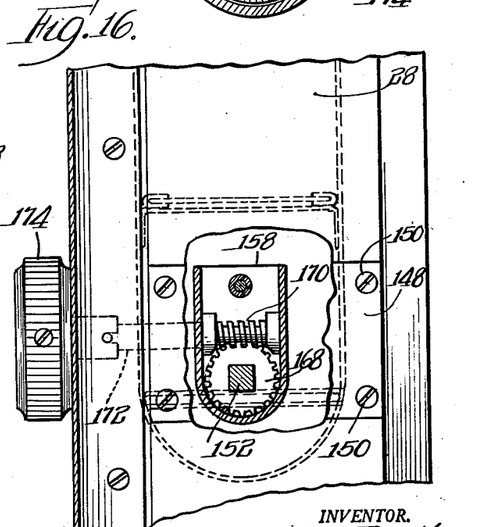
Fig. 16 is a further view of the parts of Fig. 15, taken along the line 16—16 thereof.

The front and rear edges of the tubular frame bars 22, 24, 26 and 28 are provided with suitable recesses shaped to conform to and hold a pair of rectangular gaskets 40 and 42 of rubber or the like, Fig. 4, which gaskets receive and hold in position glass window panes as indicated at 44 and 46. In the particular embodiment shown the glass pane 44, which is disposed externally of the window frame structure, comprises a single pane of suitably tinted heat absorbing glass, whereas the interiorly facing glass panes as indicated at 46 may comprise double wall laminated safety glass, particularly in installations wherein the structure is to be used in vehicles or the like. To firmly anchor the gaskets 40 and 42 in position, and so as to enable the gaskets to form a gas-tight seal between the frame tubes and the panes of glass, retention plates as indicated at 48 and 50, Fig. 4, are provided. These plates, which are anchored to the frame tubes by screws 52, compress the legs of the channel-like gaskets against the glass panes and against the frame tubes so as to provide a shock-resistant support for the glass panes as well as a gas-tight peripheral seal. It will be noted that rubber sheets or gaskets as indicated at 54, Figs. 9 and 15, are compressed between the ends of the tubular frame bars. These gaskets, together with the gaskets 40 and 42, define an air or gas-tight chamber 56 between the glass panes, whereby to provide effective thermal insulation, and also to minimize fogging of the glass due to temperature changes and the like, to which the construction may be subjected.

To facilitate the maintenance of a vacuum within the air-tight chamber 56, automatically acting valve means is provided, as shown in Figs. 5, 6 and 7. As shown in Figs. 5 and 6, the internally facing wall 58 of the tubular frame bar 26 is suitably drilled and threaded so as to receive a metallic valve nipple 60, a gasket as indicated at 62 being compressed between the parts so as to provide a gas-tight connection. The head portion of the nipple 60 is arranged to receive a rubber valve member 64, which as best shown in Fig. 7, is provided with a cylindrical portion 66 having an annular groove adapted to interfit with the nipple head. The rubber valve member is further provided at its outer end with a pair of contacting ears 68 defining a normally closed slit or opening 70 therebetween, which opening communicates with a longitudinal bore 72 in the nipple 60, and resultingly with the closed chamber 56 between the glass panes. As gas pressure rises within the closed chamber 56, as for example by subjecting the structure to the heat of the sun or other heating means, the valve passage 70 automatically opens so as to eject air from the closed chamber into the interior of the chamber 74 of the frame bar 26, which as will presently appear, is in free communication with the outside atmosphere. However, upon the formation of vacuum conditions within the closed chamber 56, as the structure is cooled, the valve passage 70 automatically closes and seals the chamber 56 so as to maintain the vacuum. Accordingly, at all times except when the structure is subjected to its maximum conditions of temperature, a partial vacuum is maintained within the chamber 56 so as to provide increased thermal insulation, as previously set forth. Alternatively, the valve nipple 60 may be subjected to the action of a vacuum pump, either as the structure is initially fabricated, or from time to time as may be required, and the valve 64 then applied so as to hold the vacuum within the closed chamber over relatively long periods of time due to the several sealing means provided.

Figure 8:
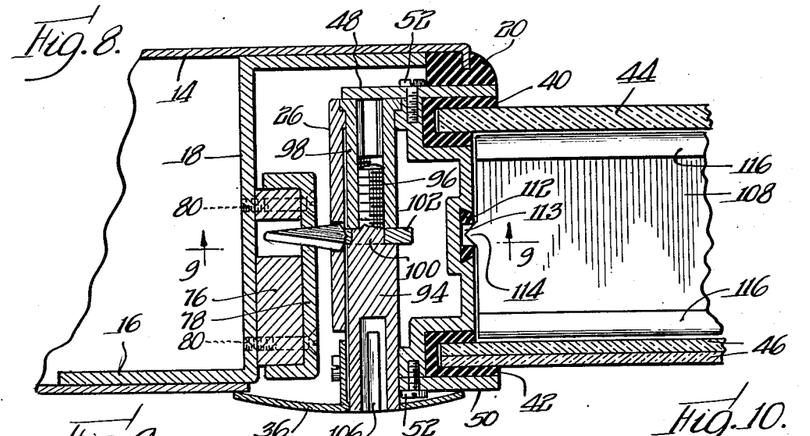
Fig. 8 is a partial sectional view of a portion of the frame structure, and associated parts, taken as indicated by the line 8—8 of Fig. 1.

As previously indicated, the composite window frame structure 10 is pivotally hinged to the vehicle or building wall 12 in the embodiment disclosed. This hinge means is best shown in Figs. 9–11, and the locking means cooperative therewith are best shown in Figs. 3, 8 and 9. More particularly, the opening defined by the wall member 18 is lined with a series of bars 76 and overlying channels 78, which are anchored to the wall 18 by screws 80, Fig. 8. Two hinge connections for the window frame structure are provided along one side thereof, as indicated in Fig. 1. Each of these hinge connections comprises an upper bracket 82 and a lower bracket 84. The brackets 82 are secured to the window frame bar 26 by means of screws 86 whereas the lower brackets 84 are secured to the wall structures 76—78 by means of screws 88. Each upper hinge bracket carries a pin 90 operable in an elongated slot 92 formed in the lower hinge bracket. By this means it will be seen that a loosely operable hinge connection is provided so that the window frame 10 is hingedly supported upon the wall structure 12; while at the same time a limited degree of horizontal sliding motion of the window frame within the wall opening is provided, when the window is closed, for cooperation with the locking and sealing means now to be described.

A series of locking barrels 94 are provided, there being eight such barrels in the particular embodiment set forth. These barrels project into the window frame bars 22, 24, 26 and 28, at suitable locations as shown in Fig. 1, the frame bars being provided with receiving openings for the barrels, as shown. Each locking barrel is provided with a threaded extension 96, Fig. 8, threaded into a cooperable sleeve member 98, the barrel member 94 and sleeve 98 being rotatable as a unit within the frame members when the parts are in assembled relation. The base portion 100 of the extension 96 is irregularly shaped, as shown in Fig. 9, so as to interlock with a locking tongue 102, the outer end of which is received within a slot 104 provided within the wall channel 78. The outer end of each locking barrel is provided with a polygonally formed recess 106 suitably shaped to receive an Allen wrench or similar operating tool. It will be seen that by reason of the connections provided, as the barrel 94 is rotated through a predetermined arc of rotation by means of an operating tool, a corresponding arc of rotation is imparted to the locking tongue 102, the locking parts rotating as a unit within the frame bars. The plates 48 suitably anchor the sleeves 98 in position against inadvertent longitudinal movement.

As best shown in Fig. 3, the slots 104 in the wall channels are angularly disposed so that as the tongues 102 are moved to locking position a camming action is exerted upon the window frame forcing the frame, and more particularly the plate 48, into tight sealing engagement against the wall gasket 20, as perhaps best indicated in Fig. 8, whereby to provide a windproof seal between the wall opening and the window structure. As will be understood, the loose connection between the hinge pins 90 and their cooperative slots 92 permits sufficient horizontal shifting of the window frame, as previously set forth, so as to facilitate such locking action, and so as to permit the window frame to conform to the plane of the wall gasket 20, whereby to provide an air-tight connection.

A Venetian blind structure is disposed within the closed chamber 56, air sealed operating means being provided so that the blind slats may be tilted as a unit by externally disposed operating means. More specifically, the blind structure comprises a series of slats 108, Fig. 1, disposed within the chamber 56 between the glass panels 44 and 46, and suitably hung in position by means of tapes as indicated at 110. Each of the side window frame bars 26 and 28 is provided with a longitudinally extending groove into which is fitted a rubber strip 112, Fig. 8, having spaced perforations 113 adapted for cooperation with projections 114 formed on the ends of the slats. This arrangement prevents contact between the slats and the glass panels 44 and 46 in all tilted positions of the slats, there being a slight spacing between the glass panels and the slat binding strips 116 when the slats are in horizontal position, as perhaps best indicated in Fig. 8. Preferably the binding strips 16 are constructed of suitable sound-deadening material so that noise is avoided should contact between the strips and the glass panels occur.

The slats 108 are suspended at regular intervals by the tapes 110, in the usual manner, the tapes being anchored at their ends to upper and lower tilt bars 118 and 120, Fig. 4, in a manner particularly shown in Figs. 17–23. The upper and lower tilt bars may be of substantially the same construction, the lower bar structure being shown in Figs. 17–22. Each tilt bar comprises a tubular extruded member 122, of aluminum or the like, upon which is superposed a plate 124, the parts being held in position by suitable means such as screws as indicated at 126. A hanger bracket is secured to each end of each bar structure. The hanger brackets for the two ends of the upper tilt bar, and the hanger bracket at one end of the lower tilt bar may all be of the same construction, as indicated at 128 in Fig. 17, each carrying a pin 130 pivotally received into an opening formed through the side frames, as shown in Fig. 9. The hanger bracket 132, Fig. 4, for the opposite end of the lower tilt bar is of slightly different construction, and cooperates with means for effecting the tilting of the lower bar structure, as will be presently described.

Figures 17, 18, 19, 20, 21, 22, 23:
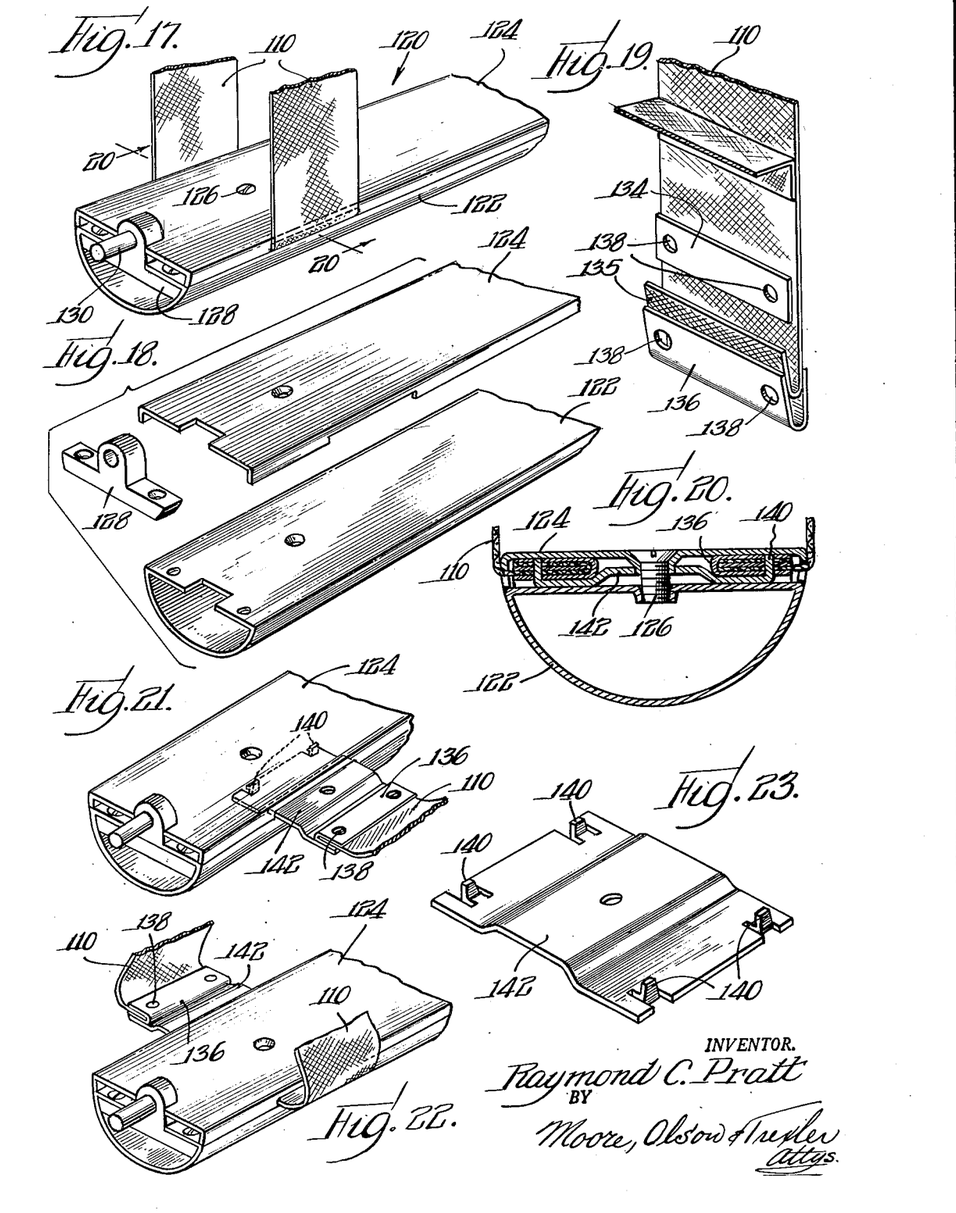
Fig. 17 is a detail perspective view of one of the tilt bars for the slat tapes, and associated connections.
Fig. 18 is an exploded view of the parts illustrated in Fig. 17.
Fig. 19 is a detail perspective view of one of the tilting tapes and its associated end brackets or connections.
Fig. 20 is an enlarged sectional view through the structures of Fig. 17, taken as indicated by the line 20—20 thereof.
Figs. 21 and 22 are illustrative perspective views showing the manner of connecting the tapes to the tilt bars.
Fig. 23 is an enlarged detail view of one of the bracket members forming a part of the tape connection.

Referring further to Figs. 17–23, the means for interconnecting the ends of the tapes with the tilt bars comprises a flat bar 134 receivable within the bight portion 135 of the tape end, and a channel shaped bar 136 arranged to embrace the bight tape end in a manner as indicated in Fig. 19, whereby to provide a firm and readily assembled bracket anchorage for the tape end. The bars 134 and 136, when in assembled position, are provided with aligned openings 138 arranged to receive barbs 140 suitably provided upon a plate bracket 142, Fig. 23, arranged to be anchored to the tilt bars by means of the screws 126 previously mentioned. The barbs may be readily projected through the fabric of the tapes, without the cutting or tearing thereof. In effecting the securing of the tape ends, the brackets 142 may be first projected to one side of the tilt bar, and then to the other, as indicated in Figs. 21 and 22, and the tape ends anchored thereto as described. As the bracket 142 is brought into proper position, and secured by the associated screw 126, the tape ends and the bars 134 and 136 will be drawn into position and the tape ends securely held, as shown.

The connections thus provided afford readily operable means for securing the tapes to the tilt bars, without cutting or tearing of the tapes, and further provide a firm and durable anchorage for the tape ends.

To provide light-tightness between the upper and lower tilt bars and the associated upper and lower window frame bars 22 and 24, the latter are provided with longitudinally extending grooves arranged to receive rubber strips 144 and 146, Fig. 4. These strips are provided with arcuately shaped surfaces slightly spaced from but cooperable with the arcuately curved surfaces of the tilt bars, providing light-tightness in all tilted positions of the slats.

To effect the tilting of the blind slats 108, means is provided, as previously indicated, for effecting the tilting of the lower tilt bar 120 by manual operation externally of the sealed chamber 56, while preserving the fluid-tightness thereof. Such means is illustrated in Figs. 12-16.

The tubular frame bar 28 is cut away adjacent its lower end, to provide an opening of predetermined size, the opening thus provided being closed by means of a plate 148 held in position by means of screws 150. A tilt shaft 152 has its reduced outer end journalled within the plate 148, the inner end of the shaft being upset to provide a flat portion 153 having interfitting engagement with the tilt bracket 132, Fig. 4, previously described. The tilt shaft 152 is provided with a conical bearing member 154, of rubber or the like, adapted to have relatively tight engagement with an opening formed through the inner flange 156 of the frame bar 28, as shown in Figs. 12 and 13. To hold the bearing member 154 tightly within its frame bar receiving opening, so as to provide a gas-tight joint, the tilt shaft 152 is further provided with a bracket 158 and a spacing washer 160, the sizing of the parts being such as to hold the bearing member or plug 154 in slightly compressed sealing position.

The bracket 158 more specifically comprises a body member 162 and a plate member 164 held in position thereon by screws 166. This bracket carries a worm gear 168, mounted upon a suitably squared portion of the shaft 152, the worm gear having meshing engagement with a worm 170 formed on a shaft 172. The inner end of this shaft is journalled within the bracket 158, and the outer end of the shaft projects through the frame structure and carries on its end a manually operable knob as indicated at 174. As best shown in Fig. 13, the knob 174 is rotatably mounted upon the end of the shaft, being retained against longitudinal displacement by means of a stud 176 engageable within an annular channel or groove cut into the shaft adjacent its end portion. The shaft further carries a collar as indicated at 178 pinned to the shaft by means of a pin 180, the collar thus being rigidly mounted upon the shaft for movement therewith. The collar 178 has a flange portion 182 provided with an opening 184 into which there is projectable the end of a plunger 186 carried by the knob 174 and which is resiliently urged against the surface of the flange 182 by means of a compression spring 188.

It will be seen that by reason of the connections provided, so long as the forces exerted do not exceed the strength of the spring 188, rotation of the manual control knob 174 imparts corresponding rotation to the shafts 172 and 152, whereby to operate the tilt bracket 132 and the lower tilt bar 120 in accordance with the movements imparted to the manual control knob. The rubber plug or bearing member 154 is continuously urged into sealing engagement against the shaft 152 and its receiving opening within the frame bar 28, so as to maintain the gas-tight seal for the chamber 56 as previously described, the frictional drag imparted by the rubber plug to shaft movement, however, being insufficient to overcome the action of spring 188. When the tilt bar 120 reaches fully canted position, in either direction, resulting in a full tilting of the slats 108 into light blocking position, the spring 188 yields so that further movement of the shafts 172 and 152 is precluded, the plunger 186 sliding along the surface of the flange 182. Upon reverse rotation of the operating knob 174, however, the plunger 186 again drops into the flange opening 184 imparting rotation to the shafts. By this means the straining or jamming of the parts, beyond a preset value, is precluded.

Figure 24:
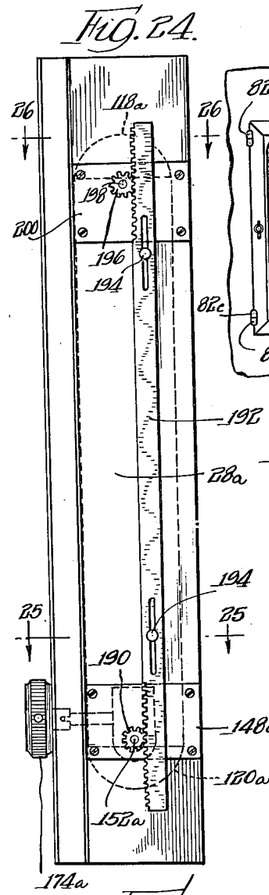
Figs. 24, 25 and 26 are views showing a modified form of slat tilting mechanism, Figs. 25 and 26 being taken on the lines 25—25 and 26—26 of Fig. 24.
Figure 25:
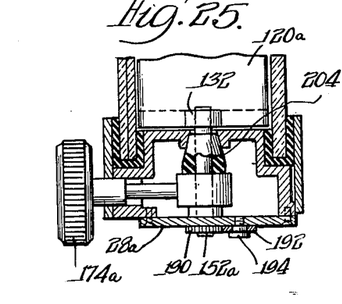
Figure 26:
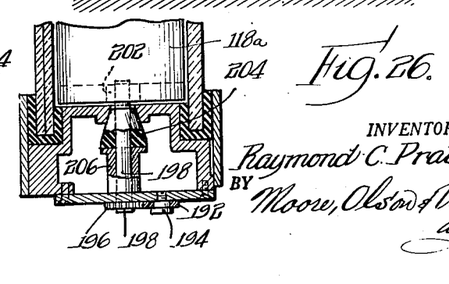

In Figs. 24—26 a modified form of structure is illustrated wherein the manual control knob as indicated at 174a is interconnected with both the upper and lower tilt bars 118a and 120a to effect the simultaneous actuation thereof. More particularly, in this instance the tilt shaft 152a, corresponding to the shaft 152 previously described, is extended through the plate 148a and has fixed to its end a gear as indicated at 190. This gear has meshing engagement with a rack 192 mounted upon the column bar 28a for vertical reciprocable movement by means of studs as indicated at 194 carried by the frame column and engageable within vertical slots in the rack. The upper end of the rack has meshing engagement with a gear 196 fixed to the end of a shaft 198 functionally similar to the shaft 152a. More particularly, the shaft 198 is journalled adjacent its outer end within a plate 200, similar to the plate 148a, the inner end of the shaft being secured to a tilt bracket 202 connected to the upper tilt bar 118a in the manner of the bracket 132 previously described. Shaft 198 is further provided with a rubber sealing and bearing member 204 similar to the bearing member 154 previously described, there being a spacing sleeve as indicated at 206 for maintaining the rubber bearing member in sealing engagement within the frame column opening.

It will be seen that by reason of the arrangement provided manual actuation of the knob 174a effects the simultaneous operation of both of the tape tilt bars, promoting smooth operation thereof, while maintaining the sealed chamber within which the bars are mounted in gas-tight condition.

It will be seen that the invention provides an improved double glass frame structure which, due to the automatically maintained vacuum therein, is of high thermal insulation efficiency. If desired, the sealed chamber 56 between the glass panels may be gas filled, and then evacuated, so as to eliminate residual moisture within the structure, and to preclude fogging due to temperature changes. If desired, bags of calcium chloride or other moisture-absorbing material may be conveniently arranged within the hollow space of the bottom bar 120 so as to further eliminate the accumulation of moisture within the sealed slat chamber. The sealed chamber 56 maintains the blind slats clean, and the exclusion of moisture promotes the wearing quality of the tapes 110 which may be depended upon for very long life. When the frame structure is swung to open position, as indicated in dotted lines in Fig. 2, the exterior surfaces of the window panels may be readily cleaned, and when the structure is in closed position it may be depended upon to be wind-proof.

Figure 27:
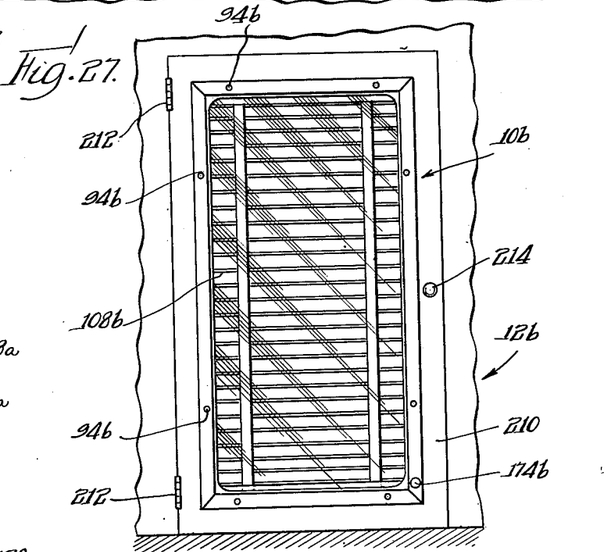
Fig. 27 is a view generally similar to Fig. 1, but illustrating a modified form of general structure.
Figure 28:
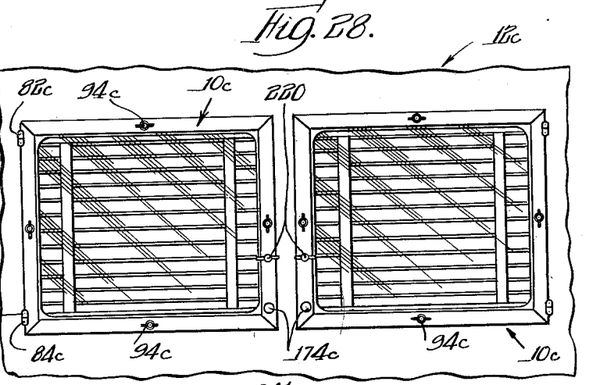
Fig. 28 is a view also generally similar to Fig. 1, but illustrating a still further modified structural embodiment of the invention.

The structure lends itself to various arrangements, as shown for example in Figs. 27 and 28.

In Fig. 27 an arrangement is shown wherein a frame 10b, corresponding to the frame 10, as previously described, is mounted within and formed as a part of a door structure 210 mounted in the usual manner within a wall or other panel 12b by means of hinges as indicated at 212, and adapted to be opened by means of a handle 214. It will be seen that in this instance hinges for the frame 10b, corresponding to the hinges 82—84 previously described, are not required, the frame 10b being held in position solely by means of the latch devices 94b corresponding to the devices 94 previously set forth. The adjustment of the slats 108b may be effected by means of the manual operating knob 174b as previously described.

In Fig. 28 a double window structure is illustrated consisting of two window frames 10c mounted within a wall or other panel as indicated at 12c. Each frame structure may be the same as the frame structure described in connection with Fig. 1 except that the locking bolts as indicated at 94c are in this instance provided with wing nut handles at their outer ends to facilitate manual actuation without special tools; and each frame structure is further provided with a handle or knob as indicated at 220 so that the frames 10c may be respectively swung to open position upon their hinges 82c—84c upon release of the locking latches 94c as previously described. It will be seen that in the form of structure thus illustrated the window frames may be very readily opened when desired.

In Figs. 29-32 a structural embodiment of the invention is illustrated, as in some instances may be desired, wherein means is incorporated for limiting the vacuum within the chamber 56 and for filtering such air as may be introduced therein during the operation of the structure.

As has been hereinbefore set forth in reference to the structures previously described, the valve member 64, Fig. 7, operates as a one way check valve exhausting air from the chamber 56 when the pressure therein rises above atmospheric, and precluding air return so as to maintain vacuum conditions within the sealed chamber during the greater proportion of the time. In certain instances, as for example where the structure is used in vehicles such as aircraft, railroad cars, and the like, the vacuum conditions thus induced within the sealed chamber of the structure may exceed the safe pressure resistance of the glass panes. For example, in aircraft, as the airplane rises to a high altitude the exhaust valve 64, previously described, will function to release air from the chamber 56 into the rarefied atmosphere, so that when the airplane returns to the ground a vacuum has been established within the chamber 56 relative to the external atmosphere at ground level. The vacuum condition thus established may be further increased by reason of temperature changes and the like as hereinbefore discussed. In instances wherein the glass panes, such as indicated at 44 and 46, are of lightweight construction such vacuum conditions may result in the stressing of the panes beyond their safe elastic limit. In Figs. 29-32 structures are incorporated for limiting the vacuum conditions within the sealed chamber, and for filtering all replacement air.

Figures 29, 30, 31, 32:
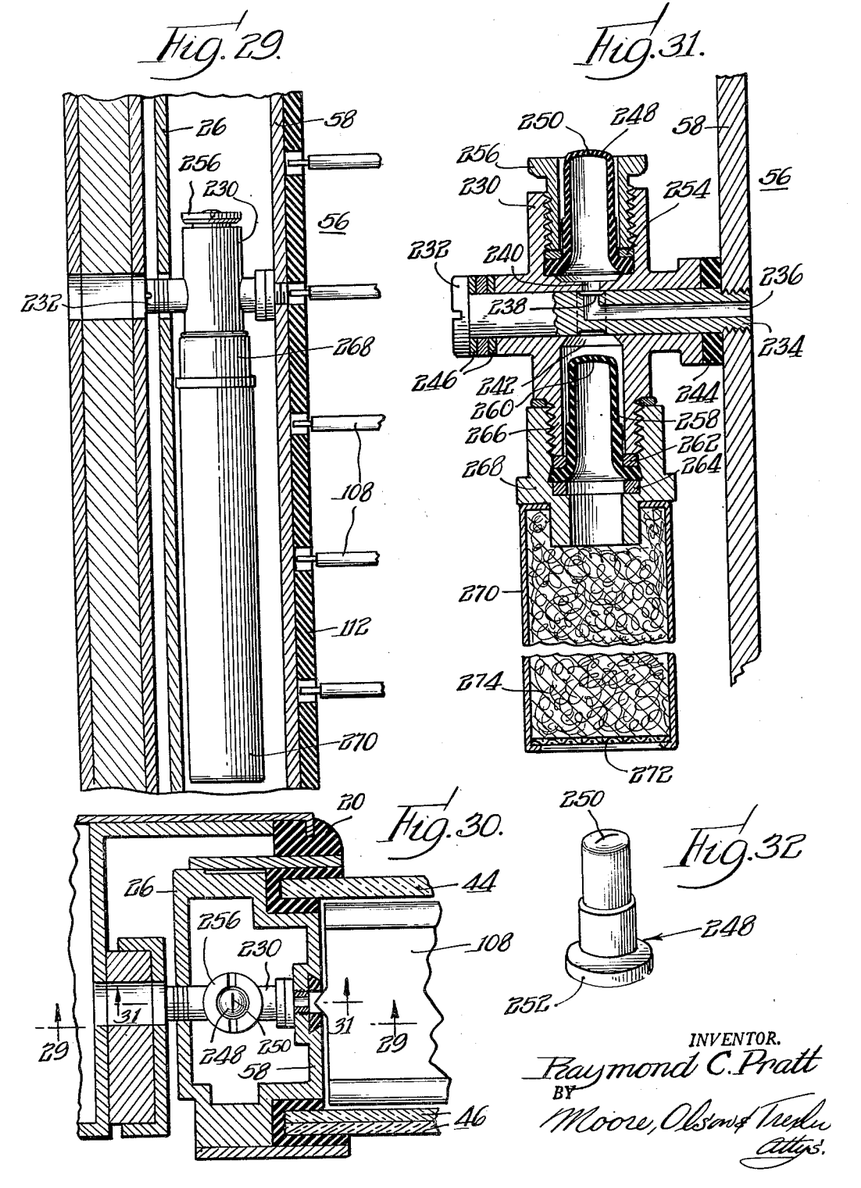
Figs. 29-32 are views of a blind structure made in accordance with the invention but embodying a modified form of valve structure which may in certain instances be desired, Fig. 30 being a view generally similar to Fig. 5, Figs. 29 and 31 being taken on the lines 29—29 and 31—31, respectively, of Fig. 30, and Fig. 22 being a detail perspective view of one of the valve parts.

Referring to Fig. 30, it will be seen that the structures therein set forth are essentially similar to those previously described in reference to Fig. 5 except for the valve. It will be seen that the valve structure in this instance comprises a body 230 disposed within the frame tube 26 and secured to the inner wall 58 thereof in a manner similar to the arrangement of the valve structure previously described. The body 230 is secured in position by means of a stud 232 which extends through an opening formed in the body, and has its end 234 threadedly secured to the frame wall 58, as best shown in Fig. 31.

The stud 232 is provided with a central bore or valve passage 236 communicating with the chamber 56, the inner end of this passage communicating with an annular groove or channel 238 in the stud, which channel has communication with oppositely extending bores or passages 240 and 242 in the body 230. Suitable gaskets are provided as indicated at 244 and 246 for preventing air leakage along the outer cylindrical surface of the stud.

The upper body passage 240 communicates with a valve member 248 shown in perspective detail in Fig. 32. The valve member is in the form of a cup or cap, of relatively soft rubber, and is provided at its end with a slit or cut 250 by which air from the passage 240 may be exhausted. As in the case of the valve member 64 previously described, the valve member 248 acts as a one way check valve permitting the exhausting of air from the chamber 56 through the passage 240, but precluding the return of air to the chamber through the valve member. In this connection it will be seen that the valve cap member 248 with its slit 250 is so formed that air passes through the slit upon the increase of pressure within the valve chamber, the slit, however, automatically closing responsive to external pressures to prevent air return therethrough. The valve member 248 may conveniently be held in airtight position by clamping its lower flange as shown at 252 between a ring 254 and an annular seating surface formed on the body 230, the ring being clamped in position by means of a threaded nut-like member 256.

The lower body passage 242 communicates with a valve member 258 which is in all essential respects similar to the valve member 248, except that the valve member 258 is formed of relatively stiff rubber so that its valve slit as indicated at 260 will open only upon the application of a substantial predetermined pressure within the cup-like valve body. The valve member 258 may be conveniently secured in position by having its lower skirt portion clamped between a pair of clamping rings 262 and 264, these clamping rings being in turn held in place and clamped between a lower threaded extension 266 of the body 230 and a cooperative coupling piece 268 threadedly secured thereto.

The coupling piece carries a downwardly extending cylindrical body 270 provided with a screen 272 at its lower end and filled with a quantity of filtering material 274 which may be of any suitable character to effect the extraction of moisture and other foreign materials from the air passing therethrough.

In the operation of the structure it will be seen that whenever pressure within the chamber 56 rises above that of the surrounding atmosphere into which the closure structure may be placed, the slit 250 of the valve member 248 opens to permit the releasing of air from the sealed chamber. As previously pointed out, the valve member 248 is preferably of soft rubber so that its valve slit will open when subjected to a very slight differential pressure.

Upon the placing of the closure structure into an atmosphere having a pressure which exceeds that existing within the chamber 56 by a predetermined amount, the valve slit 260 of the valve member 258 will open permitting the introduction of air from the atmosphere into the sealed chamber, such air however passing through the filtering material 274 so that all moisture and other foreign matter such as dirt and the like is extracted therefrom. As previously pointed out, the material of the valve member 258 is preferably somewhat stiffer than that of the valve member 248 so that the inlet valve slit 260 will open only when subjected to a differential pressure which exceeds the safe or desired pressure resistance of the glass panes 44 and 46.

By reason of the structures thus provided it will be seen that vacuum conditions are maintained within the chamber 56 the greater proportion of the time, as in the preceding embodiment, but vacuum conditions in excess of a predetermined value within the sealed chamber are precluded. Further, replacement air which finds its way into the chamber is in each instance subjected to a drying and cleaning action so that cleanliness within the blind structure is maintained and moisture condensation precluded.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A closure comprising a frame, a pair of light transmitting panels carried by the frame in predetermined spaced relation, said panels defining a chamber therebetween, a blind structure mounted within said chamber, said blind structure comprising a pair of tilt bars, light barrier means bteween each bar and the adjacent frame section, a plurality of slats disposed in superposed relation between said bars, and means operable exteriorly of said chamber for effecting the simultaneous tilting of said bars and slats.

2. A closure comprising a support, a frame carried by the support, said frame being shiftable as a unit in respect to said support and sealable thereto, a pair of light transmitting panels carried by the frame in predetermined spaced relation, said panels and frame defining a gas tight chamber therebetween, a blind structure comprising a plurality of superposed slats mounted within said chamber, and means for effecting the simultaneous tilting of the slats, said means comprising slat tilting means disposed within said chamber, an operating handle disposed exteriorly of said chamber, means extending through the frame connecting the operating handle to said tilting means, and sealing means for said connecting means.

3. A closure comprising a frame, a pair of light transmitting panels carried by the frame in predetermined spaced relation, said panels defining a chamber therebetween, a blind structure comprising a plurality of superposed slats mounted within said chamber, said slats having tapered projections extending longitudinally from the opposite ends thereof, means carried by the frame structure for holding the slats against lateral and vertical movement between said panels, said means comprising a series of frame recesses receiving the projections of the slats, and means operable exteriorly of said chamber for effecting the simultaneous tilting of said slats.

4. A closure comprising a frame, a pair of light transmitting panels carried by the frame in predetermined spaced relation, said panels defining a chamber therebetween, a blind structure mounted within said chamber, said blind structure comprising a pair of tilt bars and a plurality of slats disposed in superposed relation between said bars, the slats and bars having projections extending longitudinally from the ends thereof, the projections of the slats being tapered, means carried by the frame for holding the projections of the slats and bars from lateral and vertical movement between said panels, and means operable exteriorly of said chamber for effecting the simultaneous tilting of said slats and bars.

5. A closure for use with a support panel having an opening therein, said closure comprising a frame, a closure panel carried by the frame, a gasket member adapted to be disposed between the support panel and frame when the frame is in operative position, and latching means connecting the frame to the support panel for holding the frame within the support panel opening, said latching means including coacting cam members for compressing said gasket between the support panel and frame structures.

6. A closure for use with a support panel having an opening therein, said closure comprising a frame, a closure panel carried by the frame, a gasket member adapted to be disposed between the support panel and frame when the frame is in operative position, hinge means for supporting the frame upon the support panel, and latching means adapted to connect the frame to the support panel for holding the frame within the support panel opening, said latching means including coacting cam members for compressing said gasket between the support panel and frame structures, and said hinge means being provided with a lost motion pintle mounting to facilitate the action of said latching means.

7. A closure for use with a support panel having an opening therein, said closure comprising a frame, a pair of closure panels supported in predetermined spaced relation by the frame, said closure panels defining a chamber therebetween, a gasket member adapted to be disposed between the support panel and frame when the frame is in operative position, and latching means connecting the frame to the support panel for holding the frame within the support panel opening, said latching means including coacting cam members for compressing said gasket between the support panel and frame structures.

8. A closure for use with a support panel having an opening therein, said closure comprising a frame, a pair of closure panels supported in predetermined spaced relation by the frame, said closure panels defining a chamber therebetween, a gasket member adapted to be disposed between the support panel and frame when the frame is in operative position, hinge means for supporting the frame upon the support panel, and latching means adapted to connect the frame to the support panel for holding the frame within the support panel opening, said latching means including coacting cam members for compressing said gasket between the support panel and frame structures, and said hinge means being provided with a lost motion pintle mounting to facilitate the action of said latching means.

9. A closure for use with a support panel having an opening therein, said closure comprising a frame, a pair of closure panels carried by the frame in predetermined spaced relation, said closure panels defining a chamber therebetween, an automatically operable check valve carried by the frame permitting the passage of gases outwardly from the chamber upon an increase of pressure therein while acting to block the movement of gases into said chamber upon pressure decreases within the chamber, and means for mounting the frame within said support panel opening.

10. A closure for use with a support panel having an opening therein, said closure comprising a frame, a pair of light transmitting closure panels carried by the frame in predetermined spaced relation, said closure panels defining a chamber therebetween, a blind structure comprising a plurality of superposed slats disposed within said chamber, tilting mechanism for the slats carried by the frame, a gasket member adapted to be disposed between the support panel and frame when the frame is in operative position, means pivotally mounting the frame on the support panel, and latching means connecting the frame to the support panel for holding the frame within the support panel opening, said latching means including coacting cam members for compressing said gasket between the support panel and frame structures, and said tilting mechanism being operable in all pivotal positions of the frame.

11. A closure for use with a support panel having an opening therein, said closure comprising a frame, a pair of light transmitting closure panels carried by the frame in predetermined spaced relation, said closure panels defining a chamber therebetween, a blind structure comprising a plurality of superposed slats disposed within said chamber, tilting mechanism for the slats carried by the frame, a gasket member adapted to be disposed between the support panel and frame when the frame is in operative position, hinge means for supporting the frame upon the support panel, and latching means adapted to connect the frame to the support panel for holding the frame within the support panel opening, said latching means including coacting cam members for compressing said gasket between the support panel and frame structures, and said hinge means being provided with a lost motion pintle mounting to facilitate the action of said latching means, said tilting mechanism being operable in all pivotal positions of the frame and in all lost motion positions of said pintle.

12. A closure for use with a support panel having an opening therein, said closure comprising a frame, a pair of light transmitting closure panels carried by the frame in predetermined spaced relation, said closure panels defining a gas tight chamber therebetween, a blind structure comprising a plurality of superposed slats mounted within said chamber, means operable externally of the frame and extending therethrough for tilting the slats, a gas tight seal for the tilting means, an automatically operable check valve carried by the frame permitting the passage of gases outwardly from the chamber upon an increase of pressure therein while acting to block the movement of gases into said chamber upon pressure decreases within the chamber, and means for mounting the frame within said support panel opening.

13. A closure for use with a support panel having an opening therein, said closure comprising a frame, a pair of light transmitting closure panels carried by the frame in predetermined spaced relation, said closure panels defining a gas tight chamber therebetween, a blind structure comprising a plurality of superposed slats mounted within said chamber, means operable externally of the frame and extending therethrough for tilting the slats, a gas tight seal for the tilting means, an automatically operable check valve carried by the frame permitting the passage of gases outwardly from the chamber upon an increase of pressure therein while acting to block the movement of gases into said chamber upon pressure decreases within the chamber, gas filtering means associated with said check valve, and means for mounting the frame within said support panel opening.

14. In a blind structure having a pair of tilt bars disposed in predetermined spaced relation, tape members interconnecting the tilt bars, and a plurality of slats connected to the tape members and disposed in superposed relation between said bars, the combination of means for connecting the end of a tape member to a tilt bar, said connecting means comprising a plate member adapted to lie within a reversely folded end portion of the tape member, a channel plate member adapted to embrace said tape end portion, and means for connecting said plate members to each other and to the associated tilt bar structure.

15. A closure for use with a support panel having an opening therein, said closure comprising a frame, a pair of glass closure panels carried by the frame in predetermined spaced relation, said glass panels defining a gas tight chamber therebetween, a check valve permitting the passage of air from said chamber and preventing the passage of air thereto, a blind structure disposed within said chamber, said blind structure comprising a pair of tilt bars and a plurality of slats disposed between said bars in superposed relation, means operable exteriorly of said chamber and extending through the frame for tilting the slats and bars, a gas tight seal for the tilting means, a gasket adapted to be disposed between the support panel and the frame when the frame is in operative position, and means connecting the frame to the support panel for holding the frame within the support panel opening and for compressing said gasket between the support panel and frame structures.

16. A closure for use with a support panel having an opening therein, said closure comprising a frame, a pair of closure panels carried by the frame in predetermined spaced relation, said closure panels defining a chamber therebetween, check valve means responsive to an increase in pressure within the chamber for releasing air therefrom, and check valve means responsive to a decrease in pressure within the chamber for admitting air thereto.

17. A closure for use with a support panel having an opening therein, said closure comprising a frame, a pair of closure panels carried by the frame in predetermined spaced relation, said closure panels defining a chamber therebetween, check valve means responsive to an increase in pressure within the chamber for releasing air therefrom, check valve means responsive to a decrease in pressure within the chamber for admitting air thereto, and filtering material associated with said last named valve means for filtering the air passing therethrough.

18. A closure for use with a support panel having an opening therein, said closure comprising a frame, a pair of closure panels carried by the frame in predetermined spaced relation, said closure panels defining a gas tight chamber therebetween, a blind structure comprising a plurality of superposed slats mounted within said chamber, means operable externally of the frame and extending therethrough for tilting the slats, a gas tight seal for the tilting means, check valve means responsive to an increase in pressure within the chamber for releasing air therefrom, and check valve means responsive to a decrease in pressure within the chamber for admitting air thereto.

19. A closure comprising a frame, a pair of light transmitting panels carried by the frame in predetermined spaced relation, sealing means connecting the frame to the panels, said sealing means frame and panels defining a gas tight chamber, a blind structure comprising a plurality of superposed slats mounted within said chamber, means extending into and operable exteriorly of said chamber for shifting the slats, and sealing means for said slat shifting means comprising a tapered bearing plug of rubber or like material.

20. A closure comprising a frame, a pair of light transmitting panels carried by the frame in predetermined spaced relation, said panels defining a chamber therebetween, a blind structure mounted within said chamber, said blind structure comprising a pair of tilt bars at the top and bottom of the structure and a plurality of slats disposed in superposed relation between said bars, a pair of arcuately concave members carried by the frame in juxtaposition, respectively, to the tilt bars, the top surface of the top bar and the bottom surface of the bottom bar being cylindrically shaped and lying within the concave surface of said frame members to provide light tightness in all adjusted positions of the bars, means carried by the frame journalling the tilt bars for rotation about fixed axes, and means operable exteriorly of said chamber for effecting the simultaneous tilting of said bars and slats.

RAYMOND C. PRATT.

REFERENCES CITED

The following references are of record in the file of this patent:

UNITED STATES PATENTS

| Number | Name | Date |
|---|---|---|
| 289,176 | Teuteberg | Nov. 27, 1883 |
| 1,794,500 | Russell | Mar. 3, 1931 |
| 2,106,308 | Soderberg | Jan. 25, 1938 |
| 2,111,980 | Lawson | Mar. 22, 1938 |
| 2,114,057 | Lorentzen | Apr. 12, 1938 |
| 2,170,877 | Simon | Aug. 29, 1939 |
| 2,202,694 | Haux | May 28, 1940 |
| 2,249,641 | Stucki | July 15, 1941 |
| 2,280,389 | Edwards | Apr. 21, 1942 |
| 2,280,540 | Persson | Apr. 21, 1942 |
| 2,373,214 | Wolkenhauer | Apr. 10, 1945 |
| 2,378,591 | Solis | June 19, 1945 |
| 2,403,246 | Sperling | July 2, 1946 |
| 2,415,222 | Spencer | Feb. 4, 1947 |